Figure 1:
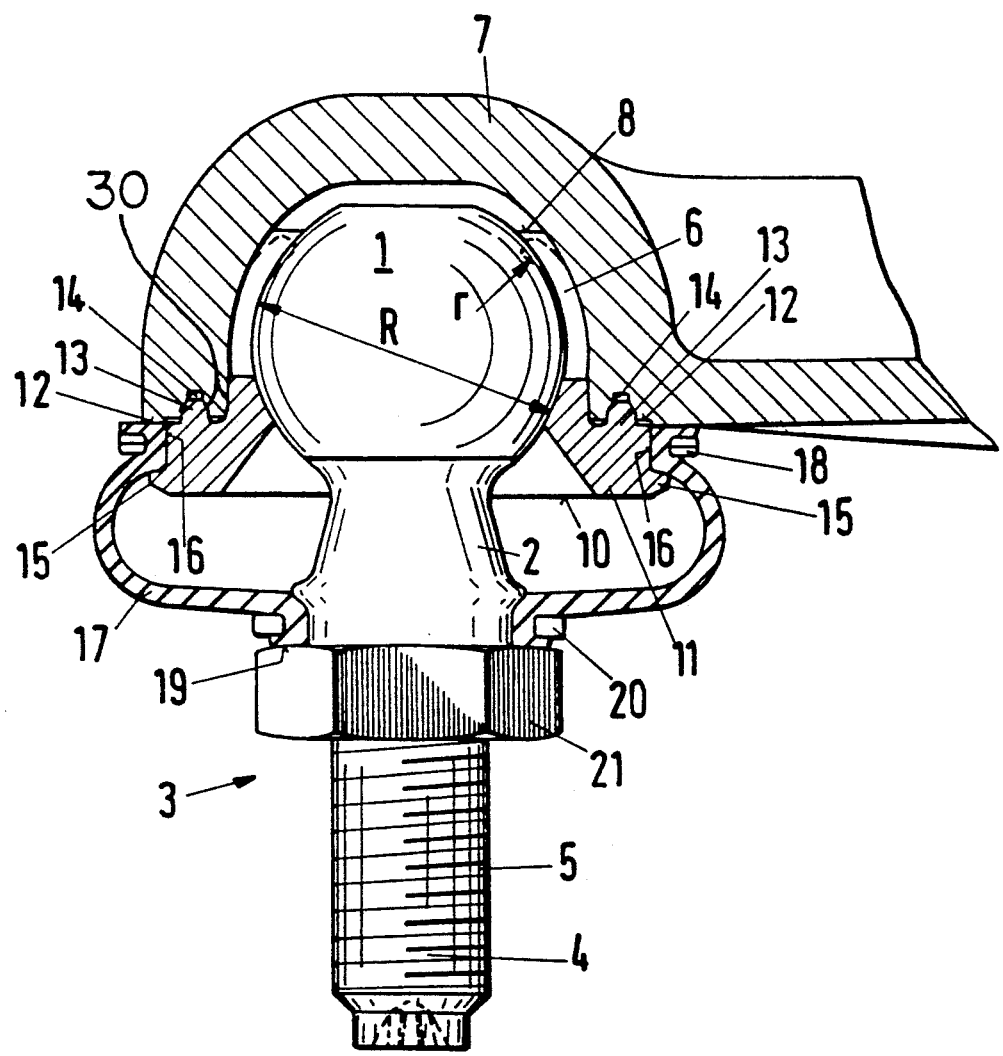

United States Patent [19]

Broszat et al.

[11] Patent Number: 5,152,628
[45] Date of Patent: Oct. 6, 1992

[54] BALL-AND-SOCKET JOINT

[75] Inventors: Lothar Broszat, Monheim; Hans-Joachim Schütt, Bergheim, both of Fed. Rep. of Germany

[73] Assignee: TRW Ehrenreich GmbH & Co. KG, Dusseldorf, Fed. Rep. of Germany

[21] Appl. No.: 770,856

[22] Filed: Oct. 3, 1991

[30] Foreign Application Priority Data

Oct. 13, 1990 [DE] Fed. Rep. of Germany ....... 4032541

[51] Int. Cl.$^5$ .............................................. F16C 11/00
[52] U.S. Cl. .................................... 403/140; 403/135; 403/122
[58] Field of Search ...................... 403/135, 140, 122

[56] References Cited

U.S. PATENT DOCUMENTS

| 1,261,770 | 4/1918 | Collier | 403/140 |
| 2,560,024 | 7/1951 | Brown | |
| 3,677,586 | 7/1972 | Stuck | 403/140 |
| 4,410,295 | 10/1983 | Ersoy | 403/135 X |
| 4,750,885 | 6/1988 | Ito | 403/140 X |
| 4,954,006 | 9/1990 | Suzuki et al. | 403/140 |

FOREIGN PATENT DOCUMENTS

| 3103954 | 9/1982 | Fed. Rep. of Germany . |
| 3843331 | 7/1989 | Fed. Rep. of Germany . |
| 3905474 | 4/1990 | Fed. Rep. of Germany . |

Primary Examiner—Andrew V. Kundrat
Attorney, Agent, or Firm—Tarolli, Sundheim & Covell

[57] ABSTRACT

The invention pertains to a ball-and-socket joint with a ball-ended spindle (3) encompassing a spherical head (1) and a link pin (2), which is movably mounted in a joint housing (7) of pot-like interior configuration. A simply producible and installable ball-and-socket joint with a secure, air- and dust-tight connection between bearing shell and joint housing has a spherical head (1), which is mounted in the joint housing (7) by means of a one-piece bearing shell (6) of plastic, while the bearing shell (6) has, on the pin side, an annular shoulder (11) extending radially outward, which is fitted to the face (12) of the joint housing (7) on the aperture side.

10 Claims, 4 Drawing Sheets

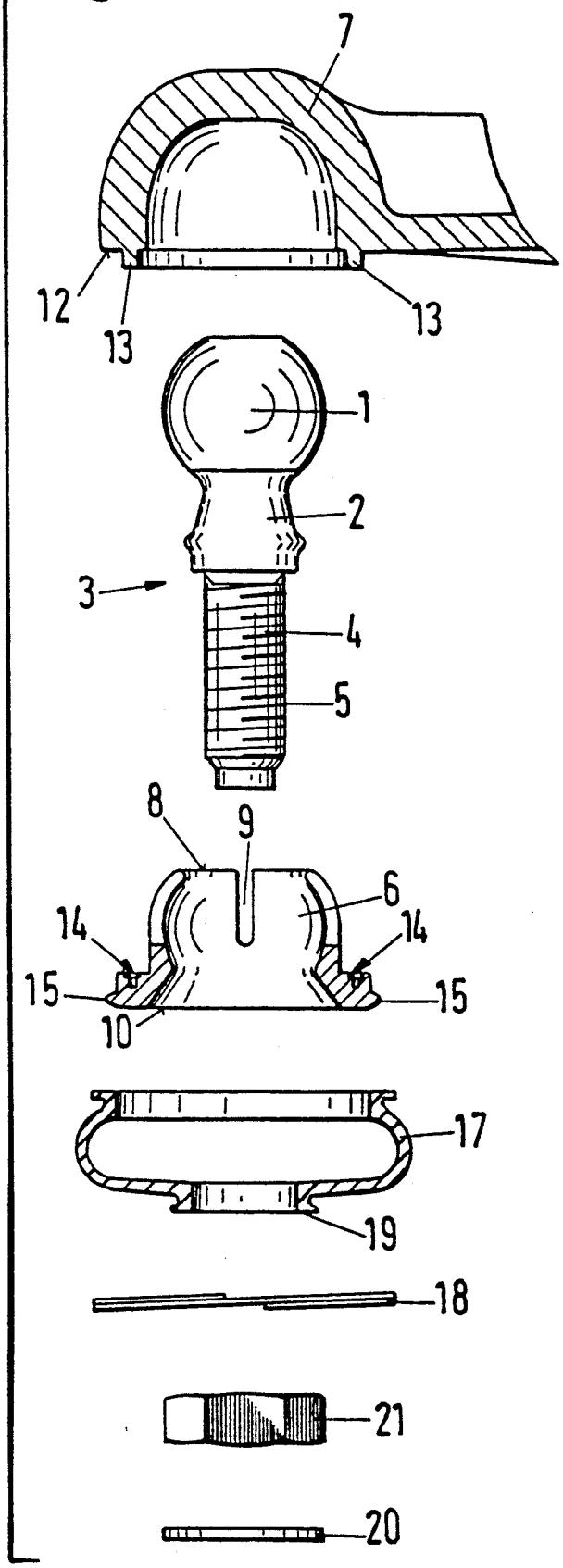

BALL-AND-SOCKET JOINT

The invention pertains to a ball-and-socket joint with a ball-ended spindle encompassing a spherical head and a link pin, which is movably mounted in a joint housing of pot-like interior configuration, while the spherical head is movably mounted in a one-piece, plastic bearing shell contained within the joint housing, and the bearing shell has, on the pin side, an annular shoulder extending radially outward, which rests against the face of the joint housing on the aperture side.

Known from German Pat. (OLS) No. 3,905,474 is a ball-and-socket joint with a plastic ball-bearing seat for the spherical section of a ball-ended spindle. On its closed side, this ball-bearing seat has an inner, annular recess and is made of a hard plastic, which imparts adequate installation elasticity to the annular recess. In the interest of enhancing the stability of the ball-and-socket joint, the ball-bearing seat is also designed with an upper and a lower tapered section Additionally known from German Pat. (OLS) No. 3,843,331 is a ball-and-socket joint with a ball-ended spindle encompassing a spherical head and a link pin, while the spherical head of the ball-ended spindle is contained within a plastic ball-bearing seat of the ball-and-socket joint. In the area of a seating connection with a metal housing, the plastic bearing seat is provided with engagement sections, at least one of which is bent over the adjoining end of the housing by the application of heat.

Disadvantageous in the case of these known ball-and-socket joints is the fact that the individual parts must be designed to fit together very precisely in order to ensure secure functioning of the ball-and-socket joint. It is also disadvantageous that the individual plastic parts of these ball-and-socket joint evidence unfavorable glide, wear, and fatigue characteristics, which can lead to alteration of the pretension and the operational indices of the ball-and-socket joint. Because of these characteristics, the plastic ball-bearing seat can separate from the joint housing after a certain period of operation.

Finally, a ball-and-socket joint is known from U.S. Pat. No. 2,560,024, which has a housing with an interior pot-like configuration, to which a ball-bearing seat is positively fitted by means of a bearing-seat shoulder resting against the rim of the housing on the pin side. The disadvantage of this previously known construction is the fact that the assembly of the individual parts is very costly and no dependably functioning connection between the bearing-seat shoulder and the housing is possible.

Proceeding from this state of the art, the objective of the invention is to specify an easily producible and dependably functioning connection between the bearing-seat shoulder and the face of the housing.

In technical realization of this objective, provision is made that the joint housing and the shoulder are positively joined together in their area of contact, in that an annular land on one of the two parts engages in an annular groove on the other part.

This ball-and-socket joint of the invention consists of only three individual parts and is easily produced and assembled, while the bearing shell is securely joined with the joint housing in such a way that an air- and dust-tight seal results. The bearing shell can be simply united with the joint housing, for instance, by gluing the shoulder of the bearing shell to the face of the joint housing. Such union is possible even when the joint housing is made of metal and the bearing shell is made of plastic. By virtue of the one-piece design of the bearing shell and the annular shoulder, cost-favorable production and assembly of this component is possible.

In a preferential embodiment form, the union of the shoulder with the joint housing is established by way of either ultrasonic or frictional welding. In this case, it is necessary that the bearing shell and shoulder, as well as the joint housing, be made of an identical plastic matrix. By welding the components with ultrasound, a play-free union between the joint housing and the bearing shell can be achieved even when the components have differing tolerances In a first preferential embodiment form, simplification of the assembly of the components and improvement of the union between the shoulder and the joint housing are achieved by means of a land encircling the shoulder, which engages in a groove in the face of the joint housing. By virtue of the encircling land, precise positioning of the bearing shell inside the joint housing is significantly simplified. Furthermore, the connecting surfaces between the shoulder and the joint housing are expanded, so that greater stability of the joined components is attained in both the axial and the radial directions of the ball-ended spindle.

In a second preferential embodiment form, a land encircling the joint housing engages in an annular groove in the shoulder. A ball-and-socket joint in keeping with this second embodiment form of the invention has the same advantages as described above.

The spherical head is mounted in the bearing shell under pretension, so that the ball-and-socket joint retains adequate torque even after a longer period of use. Furthermore, this pretension tends to compensate wear of the bearing shell and any production tolerances. In a further refinement of the ball-and-socket joint of the invention, assembly is facilitated due to the fact that the inner rim of the bearing shell has slits running in the meridional direction. Ideally, the bearing shell has four slits offset by 90° in each case.

An advantage of another design of the ball-and-socket joint lies in the fact that the shoulder has a band projecting radially outward, which, in conjunction with the face of the joint housing, forms an annular groove for a sealing diaphragm. This diaphragm is preferably secured in the groove by a tension ring.

Finally yet another design of the ball-and-socket joint is advantageously characterized by the fact that the radius of the bearing shell in the area of its inner rim is smaller than the radius of the spherical head. Consequently, the inner contour of the bearing shell differs from the outer contour of the spherical head prior to the assembly of the ball-and-socket joint. By virtue of this difference, pretension is established between the spherical head and the bearing shell when the spherical head is inserted and before the shell is installed in the joint housing.

Further details and advantages are set forth in the following description of the appended drawings, in which two preferential embodiment forms of a ball-and-socket joint in keeping with the invention are illustrated. Depicted in the drawings are:

FIG. 1, in longitudinal cross section, a first embodiment form of an assembled ball-and-socket joint.

Figure 2:
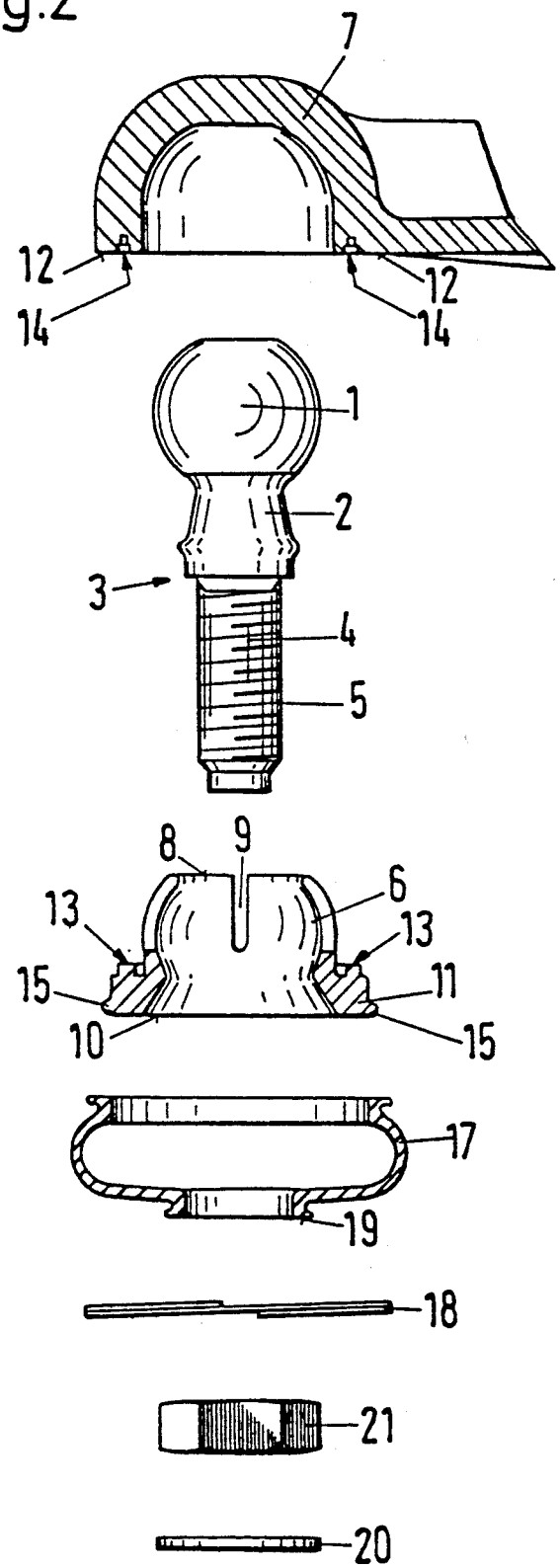

FIG. 2, the same ball-and-socket joint sectioned into an exploded view.

Figure 3:
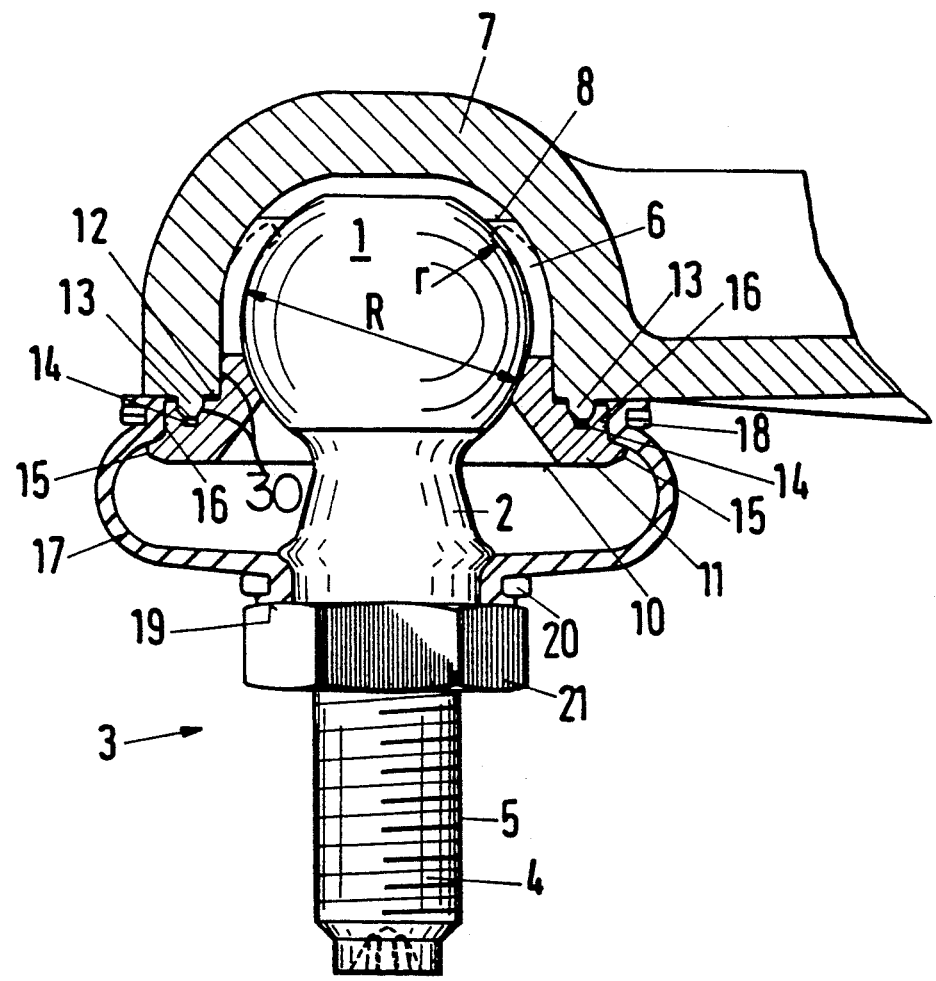

FIG. 3, in longitudinal cross section, a second embodiment form of an assembled ball-and-socket joint.

FIG. 4, the same ball-and-socket joint sectioned into an exploded view.

The ball-and-socket joint has a ball-ended spindle (3) encompassing a spherical head (1) and a link pin (2). The end (4) of the link pin (2) has a screw thread (5).

The spherical head (1) is movably retained in a bearing shell (6), which is contained within a joint housing (7). At its inner rim (8), the bearing shell (6) has four slits (9), which run in the meridional direction and are offset by 90° in each case. At this inner rim (8) of the bearing shell (6), the radius (r) of the bearing shell (6) in front of the juncture of the bearing shell (6) and the spherical head (1) is smaller than the radius (R) of the spherical head (1). By virtue of this design, pretension of the bearing shell (6) on the spherical head (1) is achieved. At the rim (10) on the pin side of the bearing shell (6), there is an annular shoulder (11) extending radially outward, which is fitted to the face (12) of the joint housing (7) on the aperture side.

In the first embodiment form depicted in FIGS. 1 and 2, the shoulder (11) has an encircling land (13), which engages in an annular groove (14) in the face (12) of the joint housing (7).

At the pin-side rim (10) of the shoulder (11), there is a band (15) extending radially outward, which, in conjunction with the face (12) of the joint housing (7), forms an encircling groove (16). Within this groove (16), a sealing diaphragm (17) is secured by a tension ring (18) to the joint housing (7) and the shoulder (11) of the bearing shell (6). At its pin-side end (19), the sealing diaphragm (17) is dust-tightly secured by a second tension ring (20) to the link pin (2). Beneath the pin-side end (19) of the sealing diaphragm (17), a nut (21) is tightened on the screw thread (5) of the ball-ended spindle (3). It is also possible that a fixed octagonal band or spanner band be provided beneath the pin-side end (19) of the sealing diaphragm (17).

The ball-and-socket joint illustrated in FIGS. 3 and 4 differs from the embodiment form described above, in that the joint housing (7) has a land (13) encircling its face (12), which engages in an annular groove (14) in the shoulder (11).

As may be seen in FIGS. 2 and 4, when the ball-and-socket joint is to be assembled, the spherical head (1) of the ball-ended spindle (3) is first forced through the aperture at the rim (8) of the bearing shell (6). Then the bearing shell (6), together with the ball-ended spindle (3), is inserted into the joint housing (7) in such a way that the land (13) engages in the annular groove (14). The plastic bearing shell (6) and the plastic joint housing (7) are then joined together by an ultrasonic weld (30), so that even wen the tolerances of the components differ, there is a play-free fit of the spherical head (1) in the bearing shell (6) and of the bearing shell (6) in the joint housing (7). Finally, the sealing diaphragm (17) is secured by the tension rings (18, 20) to the shoulder (11) of the bearing shell (6) and the link pin (2) of the ball-ended spindle (3).

LIST OF REFERENCE SYMBOLS

1. Spherical head
2. Link pin
3. Ball-ended spindle
4. End
5. Screw thread
6. Bearing shell
7. Joint housing
8. Rim
9. Slit
10. Rim
11. Shoulder
12. Face
13. Land
14. Annular groove
15. Band
16. Groove
17. Sealing diaphragm
18. Tension ring
19. End
20. Tension ring
21. Nut r Radius of the inner rim of the bearing shell
R Radius of the spherical head

We claim:

1. A ball-and-socket joint comprising:
   a joint housing (7) defining a chamber and having an opening into the chamber, the joint housing including a face (12) located adjacent the opening into the chamber;
   a ball-ended spindle (3) including a spherical head (1) in the chamber and a link pin (2) extending through the opening, the ball-ended spindle being movably mounted in the joint housing;
   a one-piece plastic bearing shell (6) having a portion in the chamber and having an annular shoulder (11), the annular shoulder extending radially outward and abutting against the face of the joint housing in an area of contact; and
   means for joining the annular shoulder and the face of the joint housing together in their area of contact, one of the joined parts including an annular land (13) and the other one of the joined parts having an annular groove (14) which receives the annular land.

2. A ball-and-socket joint according to claim 1 wherein the means for joining the annular shoulder (11) with the joint housing (7) is a frictional weld.

3. A ball-and-socket joint according to claim 1 wherein the means for joining the annular shoulder (11) with the joint housing (7) is a frictional weld.

4. A ball-and-socket joint according to claim 1 wherein the annular shoulder (11) has the annular land (13) and the face (12) of the joint housing (7) has the annular groove (14).

5. A ball-and-socket joint according to claim 1 wherein the face (12) of the joint housing (7) has the annular land (13) and the annular shoulder (11) has the annular groove (14).

6. A ball-and-socket joint according to claim 1 wherein the joint housing (7) has a base portion and the bearing shell (6) has a rim portion facing the base portion of the joint housing and from which slits (9) extend in the meridional direction.

7. A ball-and-socket joint according to claim 6 wherein the bearing shell (6) has four slits (9) offset by 90° in each case.

8. A ball-and-socket joint according to claim 1 further comprising a sealing diaphragm (17) having edges and wherein the annular shoulder (11) has a band (15) extending radially outward, the band cooperating with the face (12) of the joint housing (7) to form an encircling groove (16) which receives the edges of the sealing diaphragm.

9. A ball-and-socket joint according to claim 8 further comprising a tension ring (18) and wherein the sealing diaphragm (17) is secured in the groove (16) by the tension ring.

10. A ball-and-socket joint according to claim 1 wherein the joint housing (7) has a base portion and the bearing shell (6) has a rim portion (8) facing the base of the joint housing (7), the rim portion having a radius (r) which is smaller than the radius (R) of the spherical head (1).

* * * * *

UNITED STATES PATENT AND TRADEMARK OFFICE
CERTIFICATE OF CORRECTION

PATENT NO. : 5,152,628

DATED : October 6, 1992

INVENTOR(S) : Lothar Broszat and Hans-Joachim Schutt

It is certified that error appears in the above-identified patent and that said Letters Patent is hereby corrected as shown below:

Column 4, Line 42, Claim 2, Change "a frictional" to --an ultrasonic--.

Signed and Sealed this

Second Day of November, 1993

Attest:

BRUCE LEHMAN

*Attesting Officer*  *Commissioner of Patents and Trademarks*